United States Patent
Shozui et al.

(10) Patent No.: US 9,458,288 B2
(45) Date of Patent: Oct. 4, 2016

(54) POLYESTER COMPOUND

(71) Applicant: Ajinomoto Co., Inc., Tokyo (JP)

(72) Inventors: Fumi Shozui, Kawasaki (JP); Ryotaro Nakaya, Kawasaki (JP); Takashi Ineyama, Kawasaki (JP); Keiichi Yokoyama, Kawasaki (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 14/872,671

(22) Filed: Oct. 1, 2015

(65) Prior Publication Data

US 2016/0024247 A1 Jan. 28, 2016

Related U.S. Application Data

(63) Continuation of application No. PCT/JP2014/059677, filed on Apr. 1, 2014.

(30) Foreign Application Priority Data

Apr. 5, 2013 (JP) ................... 2013-079994

(51) Int. Cl.
*C08G 64/00* (2006.01)
*C08G 63/685* (2006.01)
*C08G 63/78* (2006.01)
*C08G 63/02* (2006.01)

(52) U.S. Cl.
CPC ........... *C08G 63/6856* (2013.01); *C08G 63/78* (2013.01)

(58) Field of Classification Search
CPC ............................ C08G 63/605; C08G 63/672
USPC ........................ 528/190, 193, 194
See application file for complete search history.

(56) References Cited

U.S. PATENT DOCUMENTS 5,274,072 A * 12/1993 Weaver ................ C07D 413/04
528/354

FOREIGN PATENT DOCUMENTS

| CN | 103012764 | 4/2013 |
|---|---|---|
| JP | 6-256484 A | 9/1994 |
| JP | 2006-282814 A | 10/2006 |
| JP | 2010-163549 A | 7/2010 |
| JP | 2011-144304 A | 7/2011 |

OTHER PUBLICATIONS

Wutz et al. Layer Structures 8. Polybenzoxazole-esters; Macromolecules, 1997, vol. 30 lines 6127-6133.*
Hans R. Kricheldorf et al. Thermotropic Polyesters based on 2-(4-carboxyphenyl)benzoxazole-5-carboxylic acid, Makromol. Chem. 193, pp. 2467-2476 (1992).*
International Search Report issued May 13, 2014 in PCT/JP2014/059677.
Hans R. Kricheldorf, et al., "New polymer syntheses, 57. Thermotropic polyesters based on 2-(4-carboxyphenyl) benzoxazole-5-carboxylic acid" Makromol. Chem., vol. 193, No. 9, 1992, pp. 2467-2476.
H. R. Kricheldorf, et al., "New Polymer Syntheses. 60. Thermostable Polymers of 2-(Hydroxyaryl) benzoxazole-5-Carboxylic Acids" Journal of Polymer Science Part A: Polymer Chemistry, vol. 29, No. 12, 1991, pp. 1751-1757.
Hans R. Kricheldorf, et al., "Whiskers. 4. Copolyesters of 4-Hydroxybenzoic Acid and 2-(4'-Hydroxyphenyl) benzoxazole-5-carboxylic Acid" Macromolecules, vol. 26, No. 24, 1993, pp. 6628-6632.
Angel Marcos-Fernandez, et al., "Novel aromatic polyamides with 1,3-benzoazole groups in the main chain. 1. Polymers derived from 2-(4-carboxyphenyl) benzoxazole-5- and 6-carboxylic acids. Synthesis and characterization" Polymer, vol. 42, No. 19, 2001, pp. 7933-7941.
Office Action dated Aug. 1, 2016 issued in corresponding Chinese patent application No. 201480019079.0.

* cited by examiner

*Primary Examiner* — Terressa Boykin
(74) *Attorney, Agent, or Firm* — Oblon, McClelland, Maier & Neustadt, L.L.P.

(57) ABSTRACT

Polyester compounds obtained by reaction of a compound represented by formula (1):

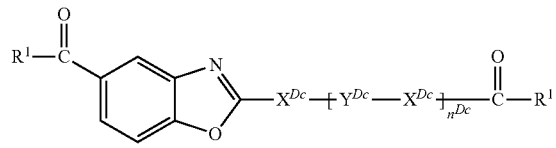

(defined herein) with a compound represented by formula (2):

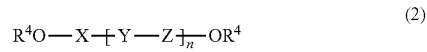

(defined herein) exhibit high thermal resistance.

17 Claims, No Drawings

POLYESTER COMPOUND

CROSS REFERENCES TO RELATED APPLICATIONS

This application is a continuation of International Patent Application No. PCT/JP2014/059677, filed on Apr. 1, 2014, and claims priority to Japanese Patent Application No. 2013-079994, filed on Apr. 5, 2013, both of which are incorporated herein by reference in their entireties.

BACKGROUND OF THE INVENTION

1. Field of the Invention

The present invention relates to a polyester compounds. The present invention also relates to methods of making such a polyester compound.

2. Discussion of the Background

Polyester compounds obtained by the reaction of aromatic dicarboxylic acids such as terephthalic acid with aromatic diols such as bisphenol A are used as engineering plastics because they have high thermal resistance and excellent strength (see, for example, JP-A-2011-144304, JP-A-2010-163549, and JP-A-H6-256484, all of which are incorporated herein by reference in their entireties). Engineering plastics are used in technical fields such as automobiles and aircrafts, electrics and electronics, and machines, and their range of applicability is enlarged.

As the range of applicability of engineering plastics is enlarged, the usage environment thereof becomes increasingly severe. Polyester compounds with higher thermal resistance are thus in demand.

Thus, there remains a need for polyester compounds with improved higher thermal resistance.

SUMMARY OF THE INVENTION

Accordingly, it is one object of the present invention to provide novel polyester compound with high thermal resistance.

It is another object of the present invention to provide novel methods of preparing such a polyester compound.

These and other objects, which will become apparent during the following detailed description, have been achieved by the inventors' discovery that a polyester compound obtained by reaction of a dicarboxylic acid having a particular structure with a diol having a particular structure exhibits high thermal resistance.

Specifically, the present invention includes the following embodiments:

(1) A polyester compound obtained by reaction of
a compound represented by formula (1):

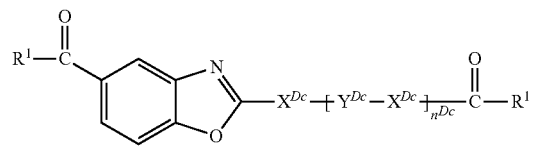

wherein
$R^1$ represents a hydroxy group, a halogen atom, an alkoxy group, a cycloalkyloxy group, an aryloxy group, a group —OM, or a group —O—Si($R^2$)$_3$, where M is a metal atom and $R^2$ is an alkyl group;

$X^{Dc}$ represents a divalent aromatic group optionally having a substituent;

$Y^{Dc}$ represents —O—, —N=N—, a carbonyl group, an ethenylene group optionally having a substituent, or a single bond;

$n^{Dc}$ represents an integer of 0 to 2; and the two $R^1$ may be the same as or different from each other; when there are a plurality of $X^{Dc}$, they may be the same as or different from each other; and when there are a plurality of $Y^{Dc}$, they may be the same as or different from each other, with a compound represented by formula (2):

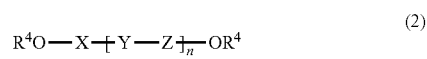

wherein
$R^4$ represents a hydrogen atom, an acyl group, or a group —Si($R^5$)$_3$, where $R^5$ is an alkyl group;

X represents a divalent aromatic group optionally having a substituent;

Y represents a methylene group optionally having a substituent, a group —S(=O)$_2$—, or a single bond;

Z represents a divalent aromatic group optionally having a substituent;

n represents 0 or 1; and the two $R^4$ may be the same as or different from each other.

(2) The polyester compound according to (1), wherein $X^{Dc}$ is a phenylene group optionally having a substituent, a naphthylene group optionally having a substituent, an anthracenylene group optionally having a substituent, a furandiyl group optionally having a substituent, a pyridinediyl group optionally having a substituent, a thiophenediyl group optionally having a substituent, or a quinolinediyl group optionally having a substituent.

(3) The polyester compound according to (1) or (2), wherein X is a phenylene group optionally having a substituent or a naphthylene group optionally having a substituent.

(4) The polyester compound according to any one of (1) to (3), wherein Z is a phenylene group optionally having a substituent.

(5) The polyester compound according to any one of (1) to (4), wherein the compound represented by formula (2) is one or more selected from the group consisting of a bisphenol optionally having a substituent, dihydroxybenzene optionally having a substituent, dihydroxynaphthalene optionally having a substituent, and biphenol optionally having a substituent.

(6) The polyester compound according to any one of (1) to (5), wherein $n^{Dc}$ is 0, and $X^{Dc}$ is a phenylene group optionally having a substituent.

(7) the polyester compound according to any one of (1) to (6), wherein:

i) n is 0, and X is a phenylene group optionally having a substituent, or ii) n is 1, X is a phenylene group optionally having a substituent, Y is a methylene group optionally having a substituent or a single bond, and Z is a phenylene group optionally having a substituent.

(8) The polyester compound according to any one of (1) to (7), wherein the substituent is selected from the group consisting of a halogen atom, an alkyl group, an aryl group, a hydroxy group, and an amino group.

(9) The polyester compound according to any one of (1) to (6), wherein the compound represented by formula (2) is one or more selected from the group consisting of a compound of formula (2-1) to formula (2-13) below:

(2-1) HO—⬡—OH (2-2) ⬡(OH)(OH) (catechol)

(2-3) HO—⬡—OH (resorcinol)

(2-4) 2-phenyl-hydroquinone with HO and OH (2-5) tBu-substituted hydroquinone, HO—⬡(tBu)—OH (2-6) HO—⬡(OH)(tBu)— (tBu-catechol)

(2-7) trimethyl hydroquinone, HO—⬡(Me)(Me)(Me)—OH (2-8) 1,4-dihydroxynaphthalene (2-9) HO—⬡—⬡—OH (4,4′-biphenol)

(2-10) HO—⬡—C(Me)(Me)—⬡—OH (bisphenol A)

(2-11) HO—⬡—C(CF$_3$)(CF$_3$)—⬡—OH (bisphenol AF)

(2-12) 9,9-bis(4-hydroxyphenyl)fluorene (2-13) HO—⬡—S(=O)$_2$—⬡—OH (bisphenol S)

(10) The polyester compound according to (9), wherein the compound represented by formula (2) is a compound represented by formula (2-1), formula (2-2), formula (2-9), formula (2-10), formula (2-11), or formula (2-12).

(11) The polyester compound according to any one of (1) to (10), wherein the polyester compound is obtained by reaction of a compound represented by formula (1), a compound represented by formula (2), and one or more selected from the group consisting of an aromatic dicarboxylic acid, a salt thereof, an ester thereof, and a halide thereof.

(12) The polyester compound according to any one of (1) to (11), wherein the polyester compound is obtained by reaction at a molar ratio of [compound represented by formula (1)]/[compound represented by formula (2)] in a range of 10/1 to 1/10.

(13) The polyester compound according to any one of (1) to (12), wherein the polyester compound is obtained by reaction at a reaction temperature in a range of −10 to 200° C.

(14) A polyester compound comprising one or more selected from the group consisting of structural units of formulae (i) to (iv) below:

(i) $*-[-C(=O)-\text{benzoxazole}-X^{Dc}-(Y^{Dc}-X^{Dc})_{nDc}-C(=O)-O-X-(Y-Z)_n-O-]-*$ -continued

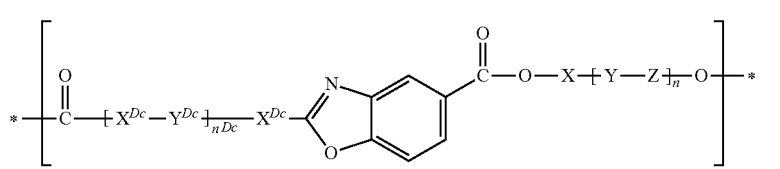
(ii)

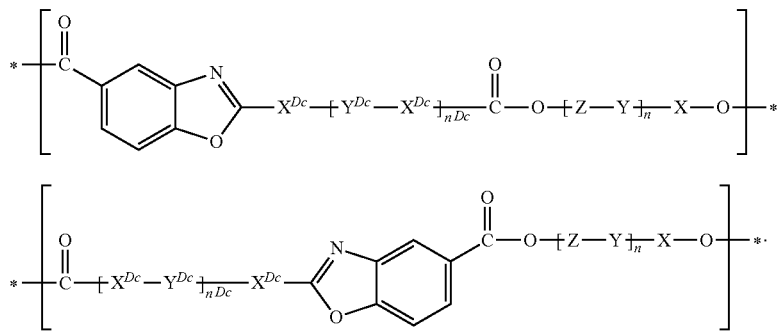
(iii)

(iv)

wherein $X_{Dc}$ represents a divalent aromatic group optionally having a substituent;

$Y^{Dc}$ represents —O—, —N=N—, a carbonyl group, an ethenylene group optionally having a substituent, or a single bond;

$n^{Dc}$ represents an integer of 0 to 2;

X represents a divalent aromatic group optionally having a substituent;

Y represents a methylene group optionally having a substituent, a group —S(=O)$_2$—, or a single bond;

Z represents a divalent aromatic group optionally having a substituent;

n represents 0 or 1;

* represents a bond; and when there are a plurality of $X^{Dc}$, they may be the same as or different from each other; and when there are a plurality of $Y^{Dc}$, they may be the same as or different from each other.

(15) The polyester compound according to (14), wherein the polyester compound has an intermediate glass transition point ($T_{mg}$) of 150° C. or higher and 300° C. or lower.

(16) The polyester compound according to (14) or (15), wherein the polyester compound has a melting point ($T_m$) of 300° C. or higher and 500° C. or lower.

(17) The polyester compound according to any one of (14) to (16) has a 5% mass reduction temperature ($T_d$) of 370° C. or higher and 500° C. or lower.

(18) A method of producing a polyester compound, comprising the step of conducting reaction of a compound represented by formula (1):

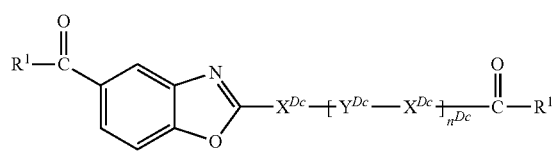
(1)

wherein $R^1$ represents a hydroxy group, a halogen atom, an alkoxy group, a cycloalkyloxy group, an aryloxy group, a group —OM, or a group —O—Si($R^2$)$_3$, where M is a metal atom and $R^2$ is an alkyl group;

$X^{Dc}$ represents a divalent aromatic group optionally having a substituent;

$Y^{Dc}$ represents —O—, —N=N—, a carbonyl group, an ethenylene group optionally having a substituent, or a single bond;

$n^{Dc}$ represents an integer of 0 to 2; and the two $R^1$ may be the same as or different from each other; when there are a plurality of $X^{Dc}$, they may be the same as or different from each other; and when there are a plurality of $Y^{Dc}$, they may be the same as or different from each other, with a compound represented by formula (2):

(2)

wherein $R^4$ represents a hydrogen atom, an acyl group, or a group —Si($R^5$)$_3$, where $R^5$ is an alkyl group;

X represents a divalent aromatic group optionally having a substituent;

Y represents a methylene group optionally having a substituent, a group —S(=O)$_2$—, or a single bond;

Z represents a divalent aromatic group optionally having a substituent;

n represents 0 or 1; and the two $R^4$ may be the same as or different from each other, at a molar ratio of [compound represented by formula (1)]/[compound represented by formula (2)] in a range of 10/1 to 1/10.

The present invention provides novel polyester compounds with high thermal resistance.

DETAILED DESCRIPTION OF THE PREFERRED EMBODIMENTS

In the present description, a ""divalent aromatic group" refers to a group in which two hydrogen atoms are removed from an aromatic ring of an aromatic compound, and includes an arylene group and a heteroarylene group.

In the present description, the term "$C_p$-$C_q$" (p and q are positive integers and satisfy p<q) denotes that the number of carbon atoms in the organic group described immediately after this term is p to q. For example, "$C_1$-$C_{12}$ alkyl group" denotes an alkyl group having 1 to 12 carbon atoms, "$C_1$-$C_{12}$ alkyl ester" refers to an ester with an alkyl group having 1 to 12 carbon atoms.

In the present description, the term "optionally having a substituent" immediately following a compound or group refers to both the case where a hydrogen atom of the compound or group is not substituted with a substituent and the case where some or all of hydrogen atoms of the compound or group are substituted with substituents.

In the present description, the term "substituent" means a halogen atom, an alkyl group, a cycloalkyl group, an alkoxy group, a cycloalkyloxy group, an aryl group, an aryloxy group, an arylalkyl group, an arylalkoxy group, a monovalent heterocyclic group, an alkylidene group, an amino group, a silyl group, an acyl group, an acyloxy group, a carboxy group, a cyano group, a nitro group, a hydroxy group, a mercapto group, and an oxo group, unless otherwise specified.

Examples of the halogen atom used as a substituent include a fluorine atom, a chlorine atom, a bromine atom, and an iodine atom.

The alkyl group used as a substituent may be either linear or branched. The number of carbon atoms in the alkyl group is preferably 1 to 20, more preferably 1 to 12, and further preferably 1 to 6. Examples of the alkyl group include a methyl group, an ethyl group, a propyl group, an isopropyl group, a butyl group, a sec-butyl group, an isobutyl group, a tert-butyl group, a pentyl group, a hexyl group, a heptyl group, an octyl group, a nonyl group, and a decyl group. As will be described later, the alkyl group used as a substituent may further have a substituent ("additional substituent"). Examples of the alkyl group having such an additional substituent include an alkyl group substituted with a halogen atom, specifically, a trifluoromethyl group, a trichloromethyl group, a tetrafluoroethyl group, and a tetrachloroethyl group.

The number of carbon atoms in the cycloalkyl group used as a substituent is preferably 3 to 20, more preferably 3 to 12, and further preferably 3 to 6. Examples of the cycloalkyl group include a cyclopropyl group, a cyclobutyl group, a cyclopentyl group, and a cyclohexyl group.

The alkoxy group used as a substituent may be either linear or branched. The number of carbon atoms in the alkoxy group is preferably 1 to 20, preferably 1 to 12, further preferably 1 to 6. Examples of the alkoxy group include a methoxy group, an ethoxy group, a propyloxy group, an isopropyloxy group, a butoxy group, a sec-butoxy group, an isobutoxy group, a tert-butoxy group, a pentyloxy group, a hexyloxy group, a heptyloxy group, an octyloxy group, a nonyloxy group, and a decyloxy group.

The number of carbon atoms in the cycloalkyloxy group used as a substituent is preferably 3 to 20, more preferably 3 to 12, and further preferably 3 to 6. Examples of the cycloalkyloxy group include a cyclopropyloxy group, a cyclobutyloxy group, a cyclopentyloxy group, and a cyclohexyloxy group.

The aryl group used as a substituent is a group in which one hydrogen atom is removed from an aromatic ring of an aromatic hydrocarbon. The number of carbon atoms in the aryl group used as a substituent is preferably 6 to 24, more preferably 6 to 18, further preferably 6 to 14, even more preferably 6 to 12, and particularly preferably 6 to 10. Examples of the aryl group include a phenyl group, a naphthyl group, and an anthracenyl group.

The number of carbon atoms in the aryloxy group used as a substituent is preferably 6 to 24, more preferably 6 to 18, further preferably 6 to 14, even more preferably 6 to 12, and particularly preferably 6 to 10. Examples of the aryloxy group used as a substituent include a phenoxy group, a 1-naphthyloxy group, and a 2-naphthyloxy group.

The number of carbon atoms in the arylalkyl group used as a substituent is preferably 7 to 25, more preferably 7 to 19, further preferably 7 to 15, even more preferably 7 to 13, and particularly preferably 7 to 11. Examples of the arylalkyl group include a phenyl-$C_1$-$C_{12}$ alkyl group, a naphthyl-$C_1$-$C_{12}$ alkyl group, and an anthracenyl-$C_1$-$C_{12}$ alkyl group.

The number of carbon atoms in the arylalkoxy group used as a substituent is preferably 7 to 25, more preferably 7 to 19, further preferably 7 to 15, even more preferably 7 to 13, and particularly preferably 7 to 11. Examples of the arylalkoxy group include a phenyl-$C_1$-$C_{12}$ alkoxy group and a naphthyl-$C_1$-$C_{12}$ alkoxy group.

The monovalent heterocyclic group used as a substituent refers to a group in which one hydrogen atom is removed from a hetero ring of a heterocyclic compound. The number of carbon atoms in the monovalent heterocyclic group is preferably 3 to 21, more preferably 3 to 15, and further preferably 3 to 9. A monovalent aromatic heterocyclic group (heteroaryl group) is also included in the monovalent heterocyclic group. Examples of the monovalent hetero ring include a thienyl group, a pyrrolyl group, a furyl group, a pyridyl group, a pyridazinyl group, a pyrimidyl group, a pyrazinyl group, a triazinyl group, a pyrrolidyl group, a piperidyl group, a quinolyl group, and an isoquinolyl group.

The alkylidene group used as a substituent refers to a group in which two hydrogen atoms are removed from the same carbon atom of an alkane. The number of carbon atoms in the alkylidene group is preferably 1 to 20, more preferably 1 to 14, further preferably 1 to 12, even more preferably 1 to 6, and particularly preferably 1 to 3. Examples of the alkylidene group include a methylidene group, an ethylidene group, a propylidene group, an isopropylidene group, a butylidene group, a sec-butylidene group, an isobutylidene group, a tert-butylidene group, a pentylidene group, a hexylidene group, a heptylidene group, an octylidene group, a nonylidene group, and a decylidene group.

The acyl group used as a substituent refers to a group represented by formula —C(=O)—R (where R is an alkyl group or an aryl group). The alkyl group represented by R may be either linear or branched. Examples of the aryl group represented by R include a phenyl group, a naphthyl group, and an anthracenyl group. The number of carbon atoms in the acyl group is preferably 2 to 20, more preferably 2 to 13, and further preferably 2 to 7. Examples of the acyl group include an acetyl group, a propionyl group, a butyryl group, an isobutyryl group, a pivaloyl group, and a benzoyl group.

The acyloxy group used as a substituent refers to a group represented by formula —O—C(=O)—R (where R is an alkyl group or an aryl group). The alkyl group represented by R may be either linear or branched. Examples of the aryl group represented by R include a phenyl group, a naphthyl group, and an anthracenyl group. The number of carbon atoms in the acyloxy group is preferably 2 to 20, more preferably 2 to 13, and further preferably 2 to 7. Examples of the acyloxy group include an acetoxy group, a propionyloxy group, a butyryloxy group, an isobutyryloxy group, a pivaloyloxy group, and a benzoyloxy group.

The substituent as described above may further have a substituent (hereinafter may be referred to as "additional substituent"). The same substituent as described above may be used as the additional substituent, unless otherwise specified.

The present invention will be described in details below with reference to preferable embodiments thereof.

Polyester Compound.

The polyester compound of the present invention is obtained by reaction of a compound represented by formula (1):

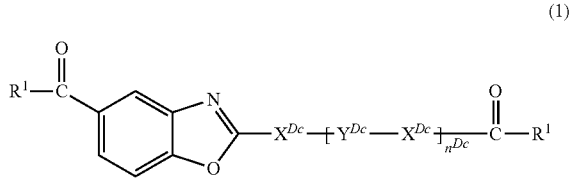

(1)

wherein $R^1$ represents a hydroxy group, a halogen atom, an alkoxy group, a cycloalkyloxy group, an aryloxy group, a group —OM, or a group —O—Si$(R^2)_3$, where M is a metal atom and $R^2$ is an alkyl group;

$X^{Dc}$ A represents a divalent aromatic group optionally having a substituent;

$Y^{Dc}$ represents —O—, —N=N—, a carbonyl group, an ethenylene group optionally having a substituent, or a single bond;

$n^{Dc}$ represents an integer of 0 to 2; and the two $R^1$ may be the same as or different from each other; when there are a plurality of $X^{Dc}$, they may be the same as or different from each other; and when there are a plurality of $Y^{Dc}$, they may be the same as or different from each other)

with a compound represented by formula (2):

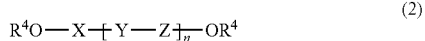

(2)

wherein $R^4$ represents a hydrogen atom, an acyl group, or a group —Si$(R^5)_3$, where $R^5$ is an alkyl group;

X represents a divalent aromatic group optionally having a substituent;

Y represents a methylene group optionally having a substituent, a group —S(=O)$_2$—, or a single bond;

Z represents a divalent aromatic group optionally having a substituent;

n represents 0 or 1; and the two $R^4$ may be the same as or different from each other.

In formula (1), $R^1$ represents a hydroxy group, a halogen atom, an alkoxy group, a cycloalkyloxy group, an aryloxy group, a group —OM, or a group —O—Si$(R^2)_3$. Here, M is a metal atom, and $R^2$ is an alkyl group. The two $R^1$ may be the same as or different from each other.

Examples of the halogen atom represented by $R^1$ include a fluorine atom, a chlorine atom, a bromine atom, and an iodine atom. A chlorine atom is preferable.

The alkoxy group represented by $R^1$ may be either linear or branched. The number of carbon atoms in the alkoxy group is preferably 1 to 10, more preferably 1 to 6, and further preferably 1 to 4. Examples of the alkoxy group represented by $R_1$ include a methoxy group, an ethoxy group, a propoxy group, an isopropyloxy group, a butoxy group, a sec-butyloxy group, an isobutyloxy group, a tert-butyloxy group, a pentyloxy group, a hexyloxy group, a heptyloxy group, an octyloxy group, a nonyloxy group, and a decyloxy group.

The number of carbon atoms in the cycloalkyloxy group represented by R' is preferably 3 to 10 and more preferably 3 to 6. Examples of the cycloalkyloxy group represented by $R^1$ include a cyclopropyloxy group, a cyclobutyloxy group, a cyclopentyloxy group, and a cyclohexyloxy group.

The number of carbon atoms in the aryloxy group represented by $R^1$ is preferably 6 to 18, more preferably 6 to 14, and further preferably 6 to 10. Examples of the aryloxy group include a phenyloxy group, a naphthyloxy group, and an anthracenyloxy group.

When $R^1$ is a group —OM (where M is a metal atom), examples of the metal atom represented by M include alkaline metals. A lithium atom, a sodium atom, a potassium atom, and a cesium atom are preferable, and a potassium atom is more preferable.

When $R^1$ is a group —O—Si$(R^2)_3$ (where $R^2$ is an alkyl group), the alkyl group represented by $R^2$ may be either linear or branched. The number of carbon atoms in the alkyl group represented by $R^2$ is preferably 1 to 10, more preferably 1 to 6, further preferably 1 to 4, even more preferably 1 to 3, and particularly preferably 1 or 2. In a group —O—Si$(R^2)_3$, the three $R^2$ may be the same as or different from each other. A preferable specific example of the group —O—Si$(R^2)_3$ is a trimethylsilyloxy group.

$R^1$ is preferably a hydroxy group, a halogen atom or an alkoxy group, more preferably a hydroxy group or a halogen atom, and further preferably a hydroxy group.

In formula (1), $X^{Dc}$ represents a divalent aromatic group optionally having a substituent.

Examples of the divalent aromatic group in $X^{Dc}$ include an arylene group and a heteroarylene group. An arylene group having 6 to 24 carbon atoms and a heteroarylene group having 3 to 21 carbon atoms are preferable. An arylene group having 6 to 18 carbon atoms and a heteroarylene group having 3 to 15 carbon atoms are more preferable. An arylene group having 6 to 14 carbon atoms and a heteroarylene group having 3 to 9 carbon atoms are further preferable. An arylene group having 6 to 10 carbon atoms and a heteroarylene group having 3 to 6 carbon atoms are even more preferable. The number of carbon atoms described above does not include the number of carbon atoms of the substituent.

Specific examples of the divalent aromatic group in $X^{Dc}$ include a phenylene group, a naphthylene group, an anthracenylene group, a pyrenediyl group, a pyrrolediyl group, a furandiyl group, a thiophenediyl group, a pyridinediyl group, a pyridazinediyl group, a pyrimidinediyl group, a pyrazinediyl group, a triazinediyl group, a pyrrolinediyl group, a piperidinediyl group, a triazolediyl group, a purinediyl group, an anthraquinonediyl group, a carbazolediyl group, a fluorenediyl group, a quinolinediyl group, and an isoquinolinediyl group.

In view of obtaining a polyester compound with high thermal resistance, the divalent aromatic group in $X^{Dc}$ is preferably an arylene group having 6 to 14 carbon atoms or a heteroarylene group having 3 to 9 carbon atoms, more preferably a phenylene group, a naphthylene group, an anthracenylene group, a furandiyl group, a pyridinediyl group, a thiophenediyl group, or a quinolinediyl, and further preferably a phenylene group or a naphthylene.

The substituent that the divalent aromatic group in $X^{Dc}$ may have is as previously mentioned. When the divalent aromatic group in $X^{Dc}$ has a plurality of substituents, they may be the same as or different from each other. Among them, the substituent that the divalent aromatic group in $X^{Dc}$ may have is preferably one or more groups selected from the group consisting of a halogen atom, an alkyl group, an aryl group, a hydroxy group, and an amino group. Among those, in the case of a halogen atom, a chlorine atom, a fluorine atom, or a bromine atom is preferable. In the case of an alkyl group, a $C_1$-$C_6$ alkyl group, for example, a methyl group, an ethyl group, a propyl group, an isopropyl group, a butyl group, a sec-butyl group, an isobutyl group, a tert-butyl group, a pentyl group, or a hexyl group is preferable. In the case of an aryl group, a phenyl group is preferable. These substituents may have an additional substituent. Thus, the substituent in the present invention includes also a fluoroalkyl group such as a trifluoromethyl, as a matter of course.

In a preferable embodiment, $X^{Dc}$ is a phenylene group optionally having a substituent, a naphthylene group optionally having a substituent, an anthracenylene group optionally having a substituent, a furandiyl group optionally having a substituent, a pyridinediyl group optionally having a substituent, a thiophenediyl group optionally having a substituent, or a quinolinediyl group optionally having a substituent.

In a further preferable embodiment, $X^{Dc}$ is a phenylene group optionally having a substituent or a naphthylene group optionally having a substituent.

In formula (1), $Y^{Dc}$ represents —O—, —N=N—, a carbonyl group, an ethenylene group optionally having a substituent, or a single bond.

The substituent that the ethenylene group in $Y^{Dc}$ may have is as previously mentioned. When the ethenylene group in $Y^{Dc}$ has a plurality of substituents, they may be the same as or different from each other. Among them, the substituent that the ethenylene group in $Y^{Dc}$ may have is preferably one or more groups selected from the group consisting of a halogen atom, an alkyl group, an aryl group, a hydroxy group, and an amino group. Among those, in the case of a halogen atom, a chlorine atom, a fluorine atom, or a bromine atom is preferable. In the case of an alkyl group, a $C_1$-$C_6$ alkyl group, for example, a methyl group, an ethyl group, a propyl group, an isopropyl group, a butyl group, a sec-butyl group, an isobutyl group, a tert-butyl group, a pentyl group, or a hexyl group is preferable. In the case of an aryl group, a phenyl group is preferable. These substituents may have an additional substituent. Thus, the substituent in the present invention includes also a fluoroalkyl group such as a trifluoromethyl group, as a matter of course.

In formula (1), $n^{Dc}$ represents an integer of 0 to 2, preferably 0 or 1, and more preferably 0. When there are a plurality of $X^{Dc}$, they may be the same as or different from each other. When there are a plurality of $Y^{Dc}$, they may be the same as or different from each other.

In formula (1), when $n^{Dc}$ is 0, $X^{Dc}$ is preferably a phenylene group optionally having a substituent, a naphthylene group optionally having a substituent, an anthracenylene group optionally having a substituent, a furandiyl group optionally having a substituent, a pyridinediyl group optionally having a substituent, or a thiophenediyl group optionally having a substituent, and more preferably a phenylene group optionally having a substituent or a naphthylene group optionally having a substituent.

In formula (1), when $n^{Dc}$ is 1 or 2, $X^{Dc}$ is preferably a phenylene group optionally having a substituent, a pyridinediyl group optionally having a substituent, or a quinolinediyl group optionally having a substituent, and $Y^{Dc}$ is preferably —O—, —N=N—, a carbonyl group, an ethenylene group optionally having a substituent, or a single bond.

In a preferable embodiment, in formula (1), $n^{Dc}$ is 0, and $X^{Dc}$ is a phenylene group optionally having a substituent.

In a further preferable embodiment, in formula (1), $n^{Dc}$ is 0, and $X^{Dc}$ is a phenylene group optionally having one or more substituents selected from the group consisting of a halogen atom, an alkyl group, an aryl group, a hydroxy group, and an amino group.

In formula (1), examples of the preferable combination of $X^{Dc}$, $Y^{Dc}$ and $n^{Dc}$ include the combinations (1) to (35) in Tables 1-1 to 1-4 below. In the tables, * indicates a bond. In the combinations (1) to (35) below, the divalent group represented as $X^{Dc}$ has a substituent at a particular position but the position of the substituent is not particularly limited. A group having a substituent at a different position may also be suitably used as $X^{Dc}$.

TABLE 1-1

| | $X^{Dc}$ | $Y^{Dc}$ | $n^{Dc}$ |
|---|---|---|---|
| (1) | *—⟨phenylene, 1,4⟩—* | — | 0 |
| (2) | *—⟨phenylene, 1,3⟩—* | — | 0 |
| (3) | *—⟨phenylene, 1,2⟩—* | — | 0 |
| (4) | H₂N-substituted phenylene | — | 0 |
| (5) | F-substituted phenylene | — | 0 |
| (6) | HO-substituted phenylene | — | 0 |
| (7) | *—⟨furan-2,5-diyl⟩—* | — | 0 |
| (8) | *—⟨pyridine-2,3-diyl⟩—* | — | 0 |

TABLE 1-1-continued

| | $X^{Dc}$ | $Y^{Dc}$ | $n^{Dc}$ |
|---|---|---|---|
| (9) | pyridine (2,6-) | — | 0 |

TABLE 1-2

| | $X^{Dc}$ | $Y^{Dc}$ | $n^{Dc}$ |
|---|---|---|---|
| (10) | pyridine (2,5-) | — | 0 |
| (11) | pyridine (2,6-) | — | 0 |
| (12) | pyridine (3,4-) | — | 0 |
| (13) | pyridine (3,5-) | — | 0 |
| (14) | thiophene (2,5-) | — | 0 |
| (15) | 5-ethylpyridine (2,3-) | — | 0 |
| (16) | naphthalene (2,3-) | — | 0 |
| (17) | naphthalene (2,6-) | — | 0 |
| (18) | naphthalene (2,7-) | — | 0 |

TABLE 1-3

| | $X^{Dc}$ | $Y^{Dc}$ | $n^{Dc}$ |
|---|---|---|---|
| (19) | naphthalene (1,4-) | — | 0 |
| (20) | naphthalene (2,3-) | — | 0 |
| (21) | naphthalene (2,6-) | — | 0 |
| (22) | anthracene (1,8-) | — | 0 |
| (23) | benzene (1,2-) | Single bond | 1 |
| (24) | benzene (1,4-) | Single bond | 1 |
| (25) | benzene (1,4-) | —CH=CH— | 1 |
| (26) | benzene (1,4-) | —C(H)=C(H)— | 1 |

TABLE 1-4

| | $X^{Dc}$ | $Y^{Dc}$ | $n^{Dc}$ |
|---|---|---|---|
| (27) | benzene (1,4-) | *—O—* | 1 |
| (28) | benzene (1,4-) | *—N=N—* | 1 |
| (29) | benzene (1,3-) | *—N=N—* | 1 |

TABLE 1-4-continued

| | $X^{Dc}$ | $Y^{Dc}$ | $n^{Dc}$ |
|---|---|---|---|
| (30) | *—⌬—* | *—N=N—* | 1 |
| (31) | *—⌬—* | *—C(=O)—* | 1 |
| (32) | (pyridinyl) | Single bond | 1 |
| (33) | (pyridinyl) | Single bond | 1 |
| (34) | (pyridinyl) | Single bond | 1 |
| (35) | (quinolinyl) | Single bond | 1 |

Among them, the combination of $X^{Dc}$, $Y^{Dc}$ and $n^{Dc}$ is preferably (1) to (6) and (16) to (21) above, and more preferably (1) to (3) and (16) to (21) above.

In another embodiment, the compound represented by formula (1) is a compound represented by formula (1'):

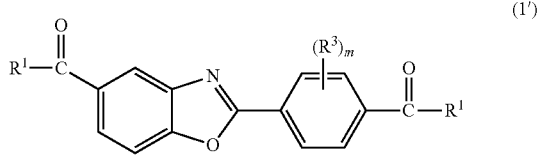

(1')

wherein
$R^1$ represents the same as defined above;
$R^3$ represents a substituent;
m represents an integer of 0 to 4; and
the two $R^1$ may be the same as or different from each other; and when there are a plurality of $R^3$, they may be the same as or different from each other.

In formula (1'), $R^3$ represents a substituent. The substituent represented by $R^3$ is as previously mentioned. Among them, a halogen atom, an alkyl group, an aryl group, a hydroxy group, and an amino group are preferable as the substituent represented by $R^3$. These substituents may have an additional substituent.

In formula (1'), m represents an integer of 0 to 4. Preferably, m is 0 to 2, more preferably 0 or 1, and further preferably 0. When there are a plurality of $R^3$, they may be the same as or different from each other.

In a preferable embodiment, the compound represented by formula (1) is 2-(4-carboxyphenyl)benzo[d]oxazole-5-carboxylic acid represented by formula (1-1) (hereinafter may be abbreviated as "4CBOC"):

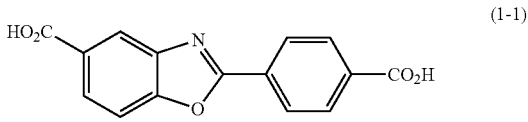 [SMILES: O=C(O)c1ccc(-c2nc3cc(C(=O)O)ccc3o2)cc1]

(1-1)

The compound represented by Formula (1) may be used singly or in combination of two or more thereof The method of producing the compound represented by formula (1) is not particularly limited. The compound represented by formula (1) may be produced by any conventionally known method. For example, 4CBOC can be produced by the method described in Examples below.

In formula (2), $R^4$ represents a hydrogen atom, an acyl group, or a group —Si($R^5$)$_3$. Here, $R^5$ is an alkyl group.

The acyl group represented by $R^4$ refers to a group represented by formula —C(=O)—R (where R is an alkyl group). The alkyl group represented by R may be either linear or branched. The number of carbon atoms in the acyl group represented by $R^4$ is preferably 2 to 5, more preferably 2 or 3, and further preferably 2. A preferable specific example of the acyl group represented by $R^4$ is an acetyl group.

When $R^4$ is a group —Si($R^5$)$_3$ (where $R^5$ is an alkyl group), the alkyl group represented by $R^5$ may be either linear or branched. The number of carbon atoms in the alkyl group represented by $R^5$ is preferably 1 to 10, more preferably 1 to 6, further preferably 1 to 4, even more preferably 1 to 3, and particularly preferably 1 or 2. In a group —Si($R^5$)$_3$, the three $R^5$ may be the same as or different from each other. A preferable specific example of a group —Si($R^5$)$_3$ is a trimethylsilyl group.

$R^4$ is preferably a hydrogen atom or an acyl group, and more preferably a hydrogen atom.

In formula (2), X represents a divalent aromatic group optionally having a substituent. Examples of the divalent aromatic group include an arylene group and a heteroarylene group. An arylene group having 6 to 24 carbon atoms and a heteroarylene group having 3 to 21 carbon atoms are preferable. An arylene group having 6 to 18 carbon atoms and a heteroarylene group having 3 to 15 carbon atoms are more preferable. An arylene group having 6 to 14 carbon atoms and a heteroarylene group having 3 to 9 carbon atoms are further preferable. An arylene group having 6 to 12 carbon atoms and a heteroarylene group having 3 to 9 carbon atoms are even more preferable. An arylene group having 6 to 10 carbon atoms and a heteroarylene group having 3 to 6 carbon atoms are particularly preferable. The number of carbon atoms described above does not include the number of carbon atoms of the substituent.

Specific examples of the divalent aromatic group in X include a phenylene group, a naphthylene group, an anthracenylene group, a thiophenediyl group, a pyrrolediyl group, a furandiyl group, a pyridinediyl group, a pyridazinediyl group, a pyrimidinediyl group, a pyrazinediyl group, a triazinediyl group, a pyrrolinediyl group, a piperidinediyl group, a quinolinediyl group, and an isoquinolinediyl group.

In view of obtaining a polyester compound with high thermal resistance, the divalent aromatic group in X is preferably an arylene group having 6 to 12 carbon atoms, and particularly preferably a phenylene group and a naphthylene group. Thus, in a preferable embodiment, X is a phenylene group optionally having a substituent or a naphthylene group optionally having a substituent.

The substituent that the divalent aromatic group in X may have is as previously mentioned. When the divalent aromatic group in X has a plurality of substituents, they may be the same as or different from each other. Among them, the substituent that the divalent aromatic group in X may have is preferably one or more groups selected from the group consisting of a halogen atom, an alkyl group, an aryl group, a hydroxy group, and an amino group, and more preferably one or more groups selected from the group consisting of a halogen atom, an alkyl group, and an aryl group. Among those, in the case of a halogen atom, a chlorine atom, a fluorine atom, or a bromine atom is preferable. In the case of an alkyl group, a $C_1$-$C_6$ alkyl group, for example, a methyl group, an ethyl group, a propyl group, an isopropyl group, a butyl group, a sec-butyl group, an isobutyl group, a tert-butyl group, a pentyl group, or a hexyl group is preferable. In the case of an aryl group, a phenyl group is preferable. These substituents may have an additional substituent. Thus, the substituent in the present invention includes also a fluoroalkyl group such as a trifluoromethyl group, as a matter of course.

In formula (2), Y is a methylene group optionally having a substituent, a group —S(=O)$_2$—, or a single bond.

The substituent that the methylene group may have is as previously mentioned. When the methylene group has two substituents, they may be the same as or different from each other. Among them, the substituent that the methylene group may have is preferably one or more groups selected from the group consisting of a halogen atom, an alkyl group, an aryl group, a hydroxy group, and an amino group, and more preferably one or more groups selected from the group consisting of a halogen atom, an alkyl group, and an aryl group. Among those, in the case of a halogen atom, a chlorine atom, a fluorine atom, or a bromine atom is preferable. In the case of an alkyl group, a $C_1$-$C_3$ alkyl group, for example, a methyl group, an ethyl group, or a propyl group is preferable. In the case of an aryl group, a phenyl group is preferable. These substituents may have an additional substituent.

When a methylene group has two substituents, the two substituents may be bonded to each other to form a ring. In such a case, examples of Y include a 9H-fluorene-9,9-diyl group and a 1,1-cyclohexandiyl group.

In formula (2), Z represents a divalent aromatic group optionally having a substituent. Examples of the divalent aromatic group include an arylene group and a heteroarylene group. An arylene group having 6 to 24 carbon atoms and a heteroarylene group having 3 to 21 carbon atoms are preferable. An arylene group having 6 to 18 carbon atoms and a heteroarylene group having 3 to 15 carbon atoms are more preferable. An arylene group having 6 to 14 carbon atoms and a heteroarylene group having 3 to 9 carbon atoms are further preferable. An arylene group having 6 to 12 carbon atoms and a heteroarylene group having 3 to 9 carbon atoms are even more preferable. An arylene group having 6 to 10 carbon atoms and a heteroarylene group having 3 to 6 carbon atoms are particularly preferable. The number of carbon atoms above does not include the number of carbon atoms of the substituent.

Specific examples of the divalent aromatic group in Z include a phenylene group, a naphthylene group, an anthracenylene group, a thiophenediyl group, a pyrrolediyl group, a furandiyl group, a pyridinediyl group, a pyridazinediyl group, a pyrimidinediyl group, a pyrazinediyl group, a triazinediyl group, a pyrrolinediyl group, a piperidinediyl group, a quinolinediyl group, and an isoquinolinediyl group.

In view of obtaining a polyester compound with high thermal resistance, an arylene group having 6 to 12 carbon atoms is preferable as the divalent aromatic group in Z. A phenylene group and a naphthylene group are more preferable, and a phenylene group is particularly preferable.

The substituent that the divalent aromatic group in Z may have is as previously mentioned. When the divalent aromatic group in Z has a plurality of substituents, they may be the same as or different from each other. Among them, the substituent that the divalent aromatic group in Z may have is preferably one or more groups selected from the group consisting of a halogen atom, an alkyl group, an aryl group, a hydroxy group, and an amino group, and more preferably one or more groups selected from the group consisting of a halogen atom, an alkyl group, and an aryl group. Among those, in the case of a halogen atom, a chlorine atom, a fluorine atom, or a bromine atom is preferable. In the case of an alkyl group, a $C_1$-$C_6$ alkyl group, for example, a methyl group, an ethyl group, a propyl group, an isopropyl group, a butyl group, a sec-butyl group, an isobutyl group, a tert-butyl group, a pentyl group, or a hexyl group is preferable. In the case of an aryl group, a phenyl group is preferable. These substituents may have an additional substituent.

In a preferable embodiment, in formula (2), Z is a phenylene group optionally having a substituent.

In formula (2), n represents 0 or 1.

In formula (2), when n is 0, it is preferable that X is a phenylene group optionally having a substituent or a naphthylene group optionally having a substituent.

In formula (2), when n is 1, it is preferable that X is a phenylene group optionally having a substituent or a naphthylene group optionally having a substituent, Y is a methylene group optionally having a substituent, a group —S(=O)$_2$—, or a single bond, and Z is a phenylene group optionally having a substituent.

In a preferable embodiment, in formula (2),
i) n is 0, and X is a phenylene group optionally having a substituent, or
ii) n is 1, X is a phenylene group optionally having a substituent, Y is a methylene group optionally having a substituent or a single bond, and Z is a phenylene group optionally having a substituent.

In a further preferable embodiment, in formula (2),
i) n is 0, and X is a phenylene group optionally having one or more substituents selected from the group consisting of a halogen atom, an alkyl group, and an aryl group, or
ii) n is 1, X is a phenylene group optionally having one or more substituents selected from the group consisting of a halogen atom, an alkyl group, and an aryl group, Y is a methylene group optionally having one or more substituents selected from the group consisting of a halogen atom, an alkyl group, and an aryl group, or a single bond, and Z is a phenylene group optionally having one or more substituents selected from the group consisting of a halogen atom, an alkyl group, and an aryl group.

In an embodiment, the compound represented by formula (2) is one or more selected from the group consisting of a bisphenol optionally having a substituent, dihydroxybenzene optionally having a substituent, dihydroxynaphthalene optionally having a substituent, and biphenol optionally having a substituent.

In the present invention, "bisphenol" means a bisphenol compound such as bisphenol A, bisphenol AP, bisphenol AF, bisphenol B, bisphenol BP, bisphenol C, bisphenol E, bisphenol F, bisphenol G, bisphenol S, bisphenol PH, bisphenol TMC, and bisphenol Z.

In a preferable embodiment, the compound represented by formula (2) is one or more selected from the group consisting of the compounds of Formula (2-1) to Formula (2-13):

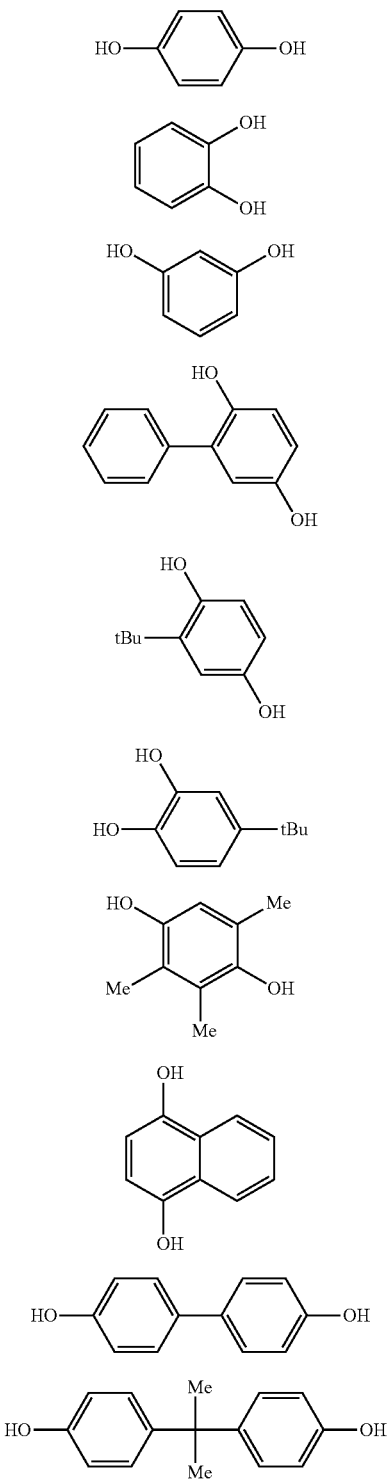

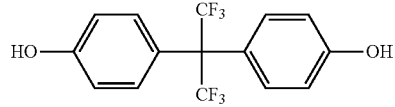

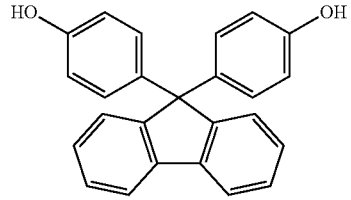

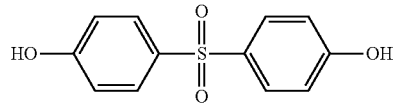

In the formulae above, Me represents a methyl group; and tBu represents a tert-butyl group. The same applies hereinafter.

X, Y, Z and n in Formula (2-1) to Formula (2-13) are as indicated in Table 2-1 and Table 2-2 below. In the tables, * represents a bond.

TABLE 2-1

| | X | Y | Z | n | Compound name |
|---|---|---|---|---|---|
| (2-1) | *–⌬–* | — | — | 0 | Hydroquinone |
| (2-2) | *⌬* (ortho) | — | — | 0 | Catechol |
| (2-3) | *⌬* (meta) | — | — | 0 | Resorcinol |
| (2-4) | *–⌬(Ph)–* | — | — | 0 | Phenylhydroquinone |
| (2-5) | *–⌬(tBu)–* | — | — | 0 | 2-tert-butylhydroquinone |
| (2-6) | *–⌬(tBu)* | — | — | 0 | 4-tert-butylcatechol |

TABLE 2-2

| | X | Y | Z | n | Compound name |
|---|---|---|---|---|---|
| (2-7) | 2,3,5-trimethylbenzene-1,4-diyl (Me, Me, Me substituents) | — | — | 0 | 2,3,5-trimethyl hydroquinone |
| (2-8) | naphthalene-1,4-diyl | — | — | 0 | 1,4-dihydroxy naphthalene |
| (2-9) | phenylene | Single bond | phenylene | 1 | Biphenol |
| (2-10) | phenylene | $-C(Me)_2-$ | phenylene | 1 | Bisphenol A |
| (2-11) | phenylene | $-C(CF_3)_2-$ | phenylene | 1 | Hexafluoro bisphenol A |
| (2-12) | phenylene | 9,9-fluorenylidene | phenylene | 1 | Bisphenol fluorene |
| (2-13) | phenylene | $-S(=O)_2-$ | phenylene | 1 | Bis(4-hydroxyphenyl) Sulfone |

The compound represented by formula (2) may be used singly or in combination of two or more thereof.

In a preferable embodiment, the compound represented by formula (2) is a compound represented by formula (2-1), formula (2-2), formula (2-9), formula (2-10), formula (2-11) or formula (2-12) above.

The polyester compound of the present invention may be produced using other compounds, as a raw material, in addition to the compound represented by formula (1) and the compound represented by formula (2) as long as the effect of the present invention is not impaired.

Examples of other compounds include aromatic dicarboxylic acids, a salt thereof, an ester thereof, and a halide thereof. Therefore, in a preferable embodiment, the polyester compound of the present invention can be obtained by reaction of the compound represented by formula (1), the compound represented by formula (2), and one or more selected from the group consisting of an aromatic dicarboxylic acid, a salt thereof, an ester thereof, and a halide thereof.

The number of carbon atoms in the aromatic dicarboxylic acid that may be used for producing the polyester compound of the present invention is preferably 8 to 18, more preferably 8 to 16, and further preferably 8 to 14. Examples of the salt of aromatic dicarboxylic acid include alkaline metal salts. Among them, lithium salts, sodium salts, potassium salts, and cesium salts are preferable, and potassium salts are more preferable. Examples of the ester of aromatic dicarboxylic acid include a $C_1$-$C_{10}$ alkyl ester (preferably a $C_1$-$C_6$ alkyl ester and more preferably a $C_1$-$C_4$ alkyl ester) and a $C_6$-$C_{18}$ aryl ester (preferably a $C_6$-$C_{14}$ aryl ester and more preferably a $C_6$-$C_{10}$ aryl ester). Examples of the halide of aromatic dicarboxylic acid include fluorides, chlorides, bromides, and iodides, and chlorides are preferable.

Examples of an aromatic dicarboxylic acid, a salt thereof, an ester thereof, and a halide thereof that may be used for producing the polyester compound of the present invention include terephthalic acid, isophthalic acid, 2,6-naphthalenedicarboxylic acid, 4,4'-biphenyldicarboxylic acid, 4,4'-dicarboxydiphenyl ether, 4,4'-dicarboxydiphenylsulfone, terephthalic acid dipotassium salt, isophthalic acid dipotassium salt, terephthalic acid dimethyl ester, isophthalic acid dimethyl ester, terephthalic acid dichloride, and isophthalic acid dichloride. Among them, terephthalic acid, isophthalic acid, and 2,6-naphthalenedicarboxylic acid are preferable.

The polyester compound of the present invention includes one or more selected from the group consisting of structural units represented by formulae (i) to (iv):

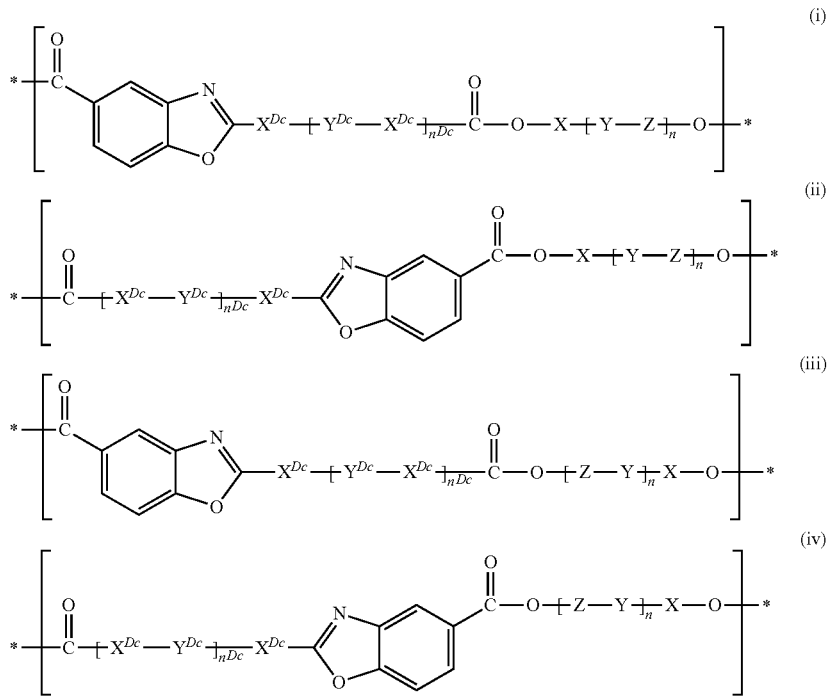

In formulae (i) to (iv), $X^{Dc}$, $Y^{Dc}$, X, Y, Z, $n^{Dc}$, and n represent the same meanings as defined above, and * represents a bond.

Preferable examples of $X^{Dc}$, $Y^{Dc}$, X, Y and Z as well as preferable ranges of $n^{Dc}$ and n are as previously mentioned.

When the polyester compound of the present invention is produced using other compounds, as a raw material, in addition to the compound represented by formula (1) and the compound represented by formula (2), the polyester compound of the present invention may further include a structural unit derived from the other compounds. For example, when the aromatic dicarboxylic acid above is used as the other compounds, the polyester compound of the present invention may further include one or more selected from the group consisting of structural units represented by Formulae (v) and (vi):

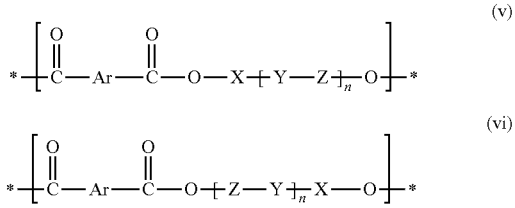

In formulae (v) and (vi), X, Y, Z and n represent the same meaning as defined above, Ar represents an arylene group, and * represents a bond.

In formulae (v) and (vi), the arylene group represented by Ar represents an arylene group derived from the aromatic dicarboxylic acid used as the "other compound". The number of carbon atoms in the arylene group represented by Ar is preferably 6 to 18, more preferably 6 to 14, and further preferably 6 to 10. Preferable specific examples of the arylene group represented by Ar include a 1,4-phenylene group, a 1,3-phenylene group, and a 2,6-naphthalylene group.

When producing the polyester compound of the present invention, the ratio of the amount (mole) of the other compounds to the total amount (mole) of the compound represented by formula (1) and the compound represented by formula (2), that is, the molar ratio of [other compounds]/([compound represented by formula (1)]+[compound represented by formula (2)]) is preferably 0.5 or less, more preferably 0.3 or less, further preferably 0.2 or less, and even more preferably 0.1 or less, in view of obtaining a polyester compound with high thermal resistance. The lower limit of the molar ratio is not particularly limited and may be 0.

When the aromatic dicarboxylic acid above is used as the other compounds, the ratio of the amount (mole) of the compound represented by formula (2) to the total amount (mole) of the compound represented by formula (1) and the aromatic dicarboxylic acid, that is, the molar ratio of [compound represented by formula (2)]/([compound represented by formula (1)]+[aromatic dicarboxylic acid]) is preferably 0.9 to 1.1 and more preferably 0.995 to 1.05.

The reaction of the compound represented by formula (1) and the compound represented by formula (2) and, if necessary, other compounds may be conducted in the presence of a condensation agent. The condensation agent is not particularly limited as long as it promotes an esterification reaction or a transesterification reaction. Examples of the condensation agent include chlorodiphenyl phosphate, tosyl chloride, triphenylphosphine dichloride, thionyl chloride, picryl chloride, hexachlorocyclotriphosphazene, phosphorus trichloride, and triphenyl phosphite. The condensation agent may be used singly or in combination of two or more thereof.

The reaction of the compound represented by formula (1) and the compound represented by formula (2) and, if necessary, other compounds may be conducted in the presence of a catalyst. The catalyst is not particularly limited as long as it promotes an esterification reaction or a transesterification reaction. Examples of the catalyst include oxides or salts of metals such as lead, zinc, manganese, calcium, cobalt, magnesium, and titanium. The catalyst may be used singly or in combination of two or more thereof.

The condensation agent and the catalyst may be used in combination. In such a case, each may be used singly (that is, a combination of one condensation agent and one catalyst), or two or more of each may be used in combination (that is, a combination of two or more condensation agents and two or more catalysts).

The reaction may be conducted in an organic solvent. Examples of the organic solvent include pyridine, N,N-dimethylformamide, N-methyl-2-pyrrolidone, carbon tetrachloride, hexachloroethane, 1,2-dichloroethane, chlorobenzene, and o-dichlorobenzene. The organic solvent may be used singly or in combination of two or more thereof In the case of a solution polymerization process in which an esterification reaction or a transesterification reaction is conducted in an organic solvent for polycondensation, the reaction is preferably conducted in an inert gas atmosphere such as argon and nitrogen and preferably conducted under atmospheric pressure (normal pressure).

In the case of a melt polymerization process in which an esterification reaction or a transesterification reaction is conducted using a molten raw material for polycondensation without using an organic solvent, the reaction is preferably conducted under an inert gas atmosphere such as argon and nitrogen and preferably conducted under a reduced pressure. The pressure is not particularly limited as long as an esterification reaction or a transesterification reaction proceeds. The pressure is preferably 750 Torr or lower, more preferably 300 Torr or lower, and further preferably 50 Torr or lower. Although the lower limit of the pressure is not particularly limited, it is usually 0.1 Torr or higher.

The reaction temperature is not particularly limited as long as an esterification reaction or a transesterification reaction proceeds. In a solution polymerization process, the reaction temperature is preferably −10 to 200° C., more preferably 0 to 150° C., further preferably 20 to 120° C., and even more preferably 20 to 100° C. In a melt polymerization process, the reaction temperature is preferably 100 to 400° C., more preferably 150 to 350° C., and further preferably 150 to 300° C.

The reaction time varies depending on the kind of the raw material, the reaction temperature, and other factors, and it is preferably 0.1 to 24 hours, more preferably 0.5 to 18 hours, and further preferably 1 to 12 hours.

The extrapolated onset temperature as glass transition temperature ($T_{ig}$) of the polyester compound of the present invention is preferably 140° C. or higher and more preferably 145° C. or higher. The polyester compound of the present invention obtained by reaction of the compound represented by formula (1) with the compound represented by formula (2) achieves a high $T_{ig}$, for example, $T_{ig}$ of 150° C. or higher, 155° C. or higher, 160° C. or higher, 165° C. or higher, or 170° C. or higher. Although the upper limit of $T_{ig}$ is not particularly limited, it is usually 300° C. or lower, 285° C. or lower, 270° C. or lower, 255° C. or lower, 240° C. or lower, or 230° C. or lower.

$T_{ig}$ can be measured, for example, using a differential scanning calorimeter.

The intermediate glass transition point ($T_{mg}$) of the polyester compound of the present invention is preferably 150° C. or higher and more preferably 155° C. or higher. The polyester compound of the present invention obtained by reaction of the compound represented by formula (1) with the compound represented formula (2) achieves a high $T_{mg}$, for example, $T_{mg}$ of 160° C. or higher, 165° C. or higher, or 170° C. or higher. Although the upper limit of $T_{mg}$ is not particularly limited, it is usually 300° C. or lower, 285° C. or lower, 270° C. or lower, 255° C. or lower, 240° C. or lower, or 230° C. or lower.

$T_{mg}$ can be measured, for example, using a differential scanning calorimeter.

The melting point ($T_m$) of the polyester compound of the present invention is preferably 300° C. or higher and more preferably 310° C. or higher. The polyester compound of the present invention obtained by reaction of the compound represented by formula (1) with the compound represented by formula (2) achieves a high $T_m$, for example, $T_m$ of 330° C. or higher, 340° C. or higher, 350° C. or higher, 360° C. or higher, 370° C. or higher, 380° C. or higher, or 390° C. or higher. Although the upper limit of $T_m$ is not particularly limited, it is usually 500° C. or lower, 470° C. or lower, 440° C. or lower, or 410° C. or lower.

$T_m$ can be measured, for example, using a differential scanning calorimeter.

The 5% mass reduction temperature ($T_d$; the temperature at a point of time when the mass of the polyester compound is reduced by 5% when the polyester compound is heated from room temperature at a certain rate of temperature increase) of the polyester compound of the present invention is preferably 370° C. or higher and more preferably 390° C. or higher. The polyester compound of the present invention obtained by reaction of the compound represented by formula (1) with the compound represented by formula (2) achieves a high $T_d$, for example, $T_d$ of 400° C. or higher, 410° C. or higher, 420° C. or higher, 430° C. or higher, 440° C. or higher, or 450° C. or higher. Although the upper limit of $T_d$ is not particularly limited, it is usually 500° C. or lower, 480° C. or lower.

$T_d$ can be measured, for example, using a thermogravimetric apparatus.

The polyester compound of the present invention has high thermal resistance and therefore can be suitably used as engineering plastics. The polyester compound of the present invention can be suitably used as engineering plastics, for example, in the energy field, automobile and aircraft fields, electrics and electronics fields, and other fields (for example, health care devices, heat resistant sheets, heat resistant fibers). Specifically, examples of applications in the energy field include solar cells (for example, casings, connectors, module covers, front protective films, back sheets, substrate supporting members), aerogenerators (for example, matrix resin for blades), fuel cells (for example, coating materials for separators), next-generation batteries such as lithium ion batteries (for example, binder, electrolytic membranes, separators), and LEDs (for example, bulb covers, reflectors, sockets, sealing materials). Examples of applications in the automobile and aircraft fields include exterior parts, connector blocks, relay blocks, interior parts, rear lamps, radiator grills, chain tensioners, wire harnesses, various gears, alternators, fuel pumps, water pumps, seal rings, fuel tubes, sensors, fuses, reflectors, engine-related parts, washers, turn signals, instrument panel lenses, motor insulating materials, clutches, and turbochargers.

Method of Producing the Polyester Compound.

The present invention also provides a method of producing a polyester compound.

In a preferable embodiment, a method of producing a polyester compound of the present invention includes the step of conducting reaction of the compound represented by formula (1) with the compound represented by formula (2).

The compound represented by formula (1), the compound represented by formula (2), and the reaction conditions (including catalyst, organic solvent, molar ratio, reaction temperature, reaction pressure, and reaction time) are as previously mentioned.

In producing the polyester compound of the present invention, the ratio in amount (mole) between the compound represented by formula (1) and the compound represented by formula (2), that is, the molar ratio of [compound represented by formula (1)]/[compound represented by formula (2)] is 10/1 to 1/10 in view of obtaining a polyester compound with high thermal resistance. The molar ratio is preferably 3/1 to 1/3, more preferably 1.5/1 to 1/1.5, and more preferably 1/1.

In the method of producing a polyester compound of the present invention, a polyester compound may be produced using other compounds, as a raw material, in addition to the compound represented by formula (1) and the compound represented by formula (2) as long as the effect of the present invention is not impaired. Examples of the other compounds include aromatic dicarboxylic acid, a salt thereof, an ester thereof, and a halide thereof In a preferable embodiment, the method of producing a polyester compound of the present invention includes the step of conducting reaction of the compound represented by formula (1), the compound represented by formula (2), and one or more selected from the group consisting of aromatic dicarboxylic acid, a salt thereof, an ester thereof, and a halide thereof.

The aromatic dicarboxylic acid, the salt thereof, the ester thereof, and the halide thereof are as previously mentioned.

When a polyester compound is produced by reaction of the compound represented by formula (1) and the compound represented by formula (2) and, if necessary, other compounds, a solution polymerization process may be used in which an esterification reaction or a transesterification reaction is conducted in an organic solvent for polycondensation, or a melt polymerization process may be used in which an esterification reaction or a transesterification reaction is conducted using a molten raw material for polycondensation without using an organic solvent. Alternatively, a polyester compound may be produced using an interfacial polymerization process. The procedures and conditions of these polymerization processes are well known in the art.

Other features of the invention will become apparent in the course of the following descriptions of exemplary embodiments which are given for illustration of the invention and are not intended to be limiting thereof.

EXAMPLES

The temperatures are indicated in centigrade unless otherwise specified. The abbreviations used in Examples include:

N,N-dimethylformamide: DMF,
N-methyl-2-pyrrolidone: NMP,
2-(4-carboxyphenyl)benzo[d]oxazole-5-carboxylic acid: 4CBOC,
2-(3-carboxyphenyl)benzo[d]oxazole-5-carboxylic acid: 3CBOC,
bisphenol A: BPA, and
hexafluorobisphenol A: BPAF.

The structures of the synthesized compounds were identified by proton nuclear magnetic resonance ($^1$H-NMR) spectra using a nuclear magnetic resonance apparatus ("AVANCE400" (400 MHz) manufactured by Bruker Corporation). The chemical shift ($\delta$) is indicated in ppm.

Synthesis Example 1

Synthesis of 2-(4-carboxyphenyl)benzo[d]oxazole-5-carboxylic acid (4CBOC)

4CBOC was synthesized in accordance with the procedures (1) to (4) below.

(1) Synthesis of 3-amino-4-hydroxybenzoic acid methyl ester hydrochloride

Into 250 mL of methanol, 32.0 g (407 mmol) of acetyl chloride was added dropwise under ice cooling. After stirring at room temperature for 30 minutes, 27.9 g of 3-amino-4-hydroxybenzoic acid (182 mmol) was added and dissolved therein, followed by heating and stirring at 80° C. for 4 hours. After being cooled to room temperature, the solution was condensed, and the resultant residue was washed with 250 mL of ethyl acetate and cooled to 0° C., followed by filtration and separation to yield a white solid. This solid was dried overnight at 50° C. under a reduced pressure, thus obtaining 30.7 g (151 mmol) of the titled compound (yield 83%).

1H-NMR (400 MHz, DMSO-d6) $\delta$: 3.81 (3H, s), 7.14 (1H, d, J=8.52 Hz), 7.78 (1H, dd, J=8.52, 2.12 Hz), 7.92 (1H, d, J=2.12 Hz).

(2) Synthesis of 2-hydroxy-5-methoxycarbonyl-N-(4-methoxycarbonylbenzylidene)-aniline Into 300 mL of methanol, 30.7 g (151 mmol) of 3-amino-4-hydroxybenzoic acid methyl ester hydrochloride was dissolved and 15.6 g (154 mmol) of triethyl amine was added dropwise. Thereafter, 24.8 g (151 mmol) of terephthalaldehydic acid methyl ester was added therein and the resultant was stirred at room temperature for 3 hours, followed by condensation and drying to yield a yellow solid. This solid was dried overnight at 50° C. under a reduced pressure, thus obtaining 47.2 g (151 mmol) of the titled compound (yield 100%).

1H-NMR (400 MHz, CDCl3) $\delta$: 3.92 (3H, s), 3.97 (3H, s), 7.06 (1H, d, J=8.5 Hz), 7.59 (1H, br), 7.95 (1H, dd, J=8.52, 1.96 Hz), 8.00-8.02 (2H, m), 8.07 (1H, d, J=1.96 Hz), 8.16-8.18 (2H, m), 8.86 (1H, s).

(3) Synthesis of 2-[4-(methoxycarbonyl)phenyl]benzo[d]oxazole-5-carboxylic acid methyl ester Into 500 mL of dichloromethane, 47.2 g (151 mmol) of 2-hydroxy-5-methoxycarbonyl-N-(4-methoxycarbonylbenzylidene)aniline was dissolved and cooled to 0° C., and then 34.3 g (151 mmol) of 2,3-dichloro-5,6-dicyano-p-benzoquinone was added therein and the resultant was stirred at 0° C. for 1 hour. A brown solid obtained by condensation and drying was washed with 1 L of an aqueous solution of 5 wt % potassium carbonate and filtered to yield a brown solid. This solid was washed using 100 mL of toluene and filtered to yield a pale brown solid. This solid was dried overnight at 50° C. under a reduced pressure, thus obtaining 40.8 g (131 mmol) of the titled compound (yield 87%).

1H-NMR (400 MHz, CDCl3) $\delta$: 3.92 (3H, s), 3.97 (3H, s), 7.65 (1H, d, J=9.12 Hz), 8.15 (1H, dd, J=8.56, 1.64 Hz), 8.20-8.22 (2H, m), 8.34-8.36 (2H, m), 8.50 (1H, m).

(4) Synthesis of 4CBOC

Into 100 mL of a solution of 1,4-dioxane/water=1/1, 10.0 g (32.1 mmol) of 2-[4-(methoxycarbonyl)phenyl]benzo[d]oxazole-5-carboxylic acid methyl ester was dissolved, and 3.37 g (80.3 mmol) of lithium hydroxide monohydrate was added thereto, and the resultant was heated and stirred at 50° C. for 1 hour. After being cooled to room temperature, the solution was condensed, and the resultant residue was dissolved in 150 mL of water and neutralized with concentrated hydrochloric acid to pH 3.0. The solid obtained by filtering the product was washed with 100 mL of methanol to yield a pale brown solid. This solid was dried overnight at 50° C. under a reduced pressure, thus obtaining 8.18 g (28.9 mmol) of the titled compound having the structure below (yield 90%).

1H-NMR (400 MHz, CDCl3) δ: 7.94 (1H, d, J=8.96 Hz), 8.09 (1H, dd, J=8.52, 1.68 Hz), 8.16-8.18 (2H, m), 8.34-8.36 (3H, m).

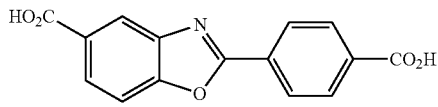 [SMILES: O=C(O)c1ccc(-c2nc3cc(C(=O)O)ccc3o2)cc1]

Synthesis Example 2

Synthesis of 2-(3-carboxyphenyl)benzo[d]oxazole-5-carboxylic acid (3CBOC)

The same operation as in Synthesis Example 1 was performed except that isophthalaldehydic acid methyl ester was used instead of terephthalaldehydic acid methyl ester, thus obtaining 8.96 g (31.6 mmol) of the titled compound having the structure below (total yield: 71.5%).

1H-NMR (400 MHz, DMSO-d6) δ: 8.75 (1H, t, J=1.68 Hz), 8.46 (1H, dt, J=8.16, 1.24 Hz), 8.35 (1H, d, J=1.44 Hz), 8.20 (1H, dt, J=7.92, 1.24 Hz), 8.08 (1H, dd, J=8.52, 1.64 Hz), 7.94 (1H, d, J=8.60 Hz), 7.79 (1H, t, J=7.80 Hz).

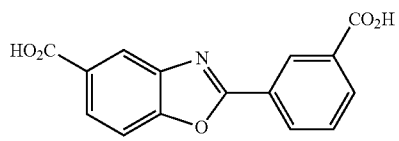 [SMILES: O=C(O)c1cccc(-c2nc3cc(C(=O)O)ccc3o2)c1]

Example 1

Synthesis of Polyester Using 4CBOC and BPA as Monomers

Into 20 mL of pyridine, 1.89 mL (9.18 mmol) of chlorodiphenyl phosphate was dissolved and 0.164 mL (2.12 mmol) of DMF was added, followed by stirring at room temperature for 30 minutes. Next, 1.00 g (3.53 mmol) of 4CBOC was added therein and the resultant was stirred at room temperature for 10 minutes. With the temperature increased to 120° C., 0.806 g (3.53 mmol) of BPA was added, followed by stirring at 120° C. for 12 hours. BPA has the structure below. The reaction mixture was cooled to room temperature and then put into a ten-fold volume of methanol and filtered to yield a pale brown solid. This solid was washed with 100 mL of boiled methanol and filtered to yield a pale brown solid. This solid was dried overnight at 50° C. under a reduced pressure, thus obtaining 0.82 g of the objective polyester compound (yield 49%).

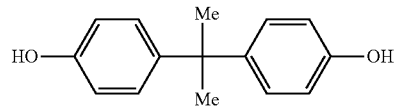 [SMILES: CC(C)(c1ccc(O)cc1)c1ccc(O)cc1]

The resultant polyester compounds were evaluated with regard to (1) and (2) below. The results are listed in Table 3.

(1) Measurement of the extrapolated onset temperature as glass transition temperature $T_{ig}$, the intermediate glass transition point $T_{mg}$, and the melting point $T_m$ $T_{ig}$, $T_{mg}$, $T_m$ were measured using a differential scanning calorimeter ("DSC6200" manufactured by Seiko Instruments Inc.). The temperature was increased from 25° C. to 420° C. at a rate of temperature increase of 10° C./minute. The extrapolated onset temperature as glass transition temperature $T_{ig}$ was obtained from the temperature at the point of intersection between a straight line extended from the base line on the low-temperature side toward the high temperature side in the DSC thermogram and a tangent line at a point that the gradient of the curve of stepwise changes of glass transition is largest. The intermediate glass transition temperature $T_{mg}$ (° C.) was obtained from the temperature at the point of inflection in the DSC thermogram (the peak top of the differential curve of the DSC thermogram). The melting point $T_m$ (° C.) was obtained from the top of the endothermic peak of the DSC thermogram.

(2) Measurement of 5% Mass Reduction Temperature $T_d$ $T_d$ was measured using a thermogravimetric apparatus ("TG/DTA6200" manufactured by Seiko Instruments Inc.). In the furnace under a nitrogen atmosphere, heating was conducted from room temperature to 550° C. at a rate of temperature increase of 10° C./minute. The temperature $T_d$ (° C.) at which the mass was reduced by 5% was obtained from the resultant thermogravimetric curve.

Examples and a reference example below were evaluated similarly. The results thereof are listed in Table 3.

Example 2

Synthesis of Polyester Using 4CBOC and BPAF as Monomers

The same operation as in Example 1 was performed except that BPAF having the structure below was used instead of BPA, thus obtaining 1.61 g of the objective polyester compound (pale brown) (yield 78%).

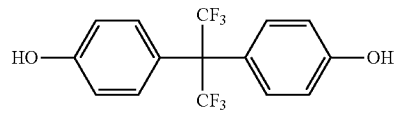

Example 3

Synthesis of Polyester Using 4CBOC and Hydroquinone as Monomers

The same operation as in Example 1 was performed except that hydroquinone having the structure below was used instead of BPA, thus obtaining 1.62 g of the objective polyester compound (pale brown) (yield 84%).

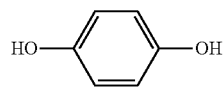

Example 4

Synthesis of Polyester Using 4CBOC and Biphenol as Monomers

The same operation as in Example 1 was performed except that biphenol having the structure below was used instead of BPA, thus obtaining 1.22 g of the objective polyester compound (pale brown) (yield 97%).

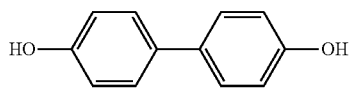 [SMILES: Oc1ccc(-c2ccc(O)cc2)cc1]

Example 5

Synthesis of Polyester Using 4CBOC and Catechol as Monomers

The same operation as in Example 1 was performed except that catechol having the structure below was used instead of BPA, thus obtaining 0.97 g of the objective polyester compound (pale brown) (yield 77%).

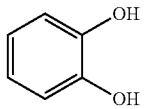

Example 6

Synthesis of Polyester Using 4CBOC and Bisphenolfluorene as Monomers

The same operation as in Example 1 was performed except that bisphenolfluorene having the structure below was used instead of BPA, thus obtaining 2.1 g of the objective polyester compound (pale brown) (yield 99%).

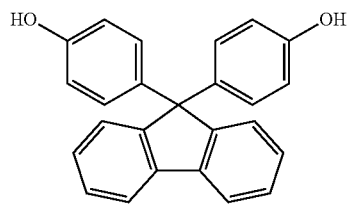 [SMILES: Oc1ccc(C2(c3ccc(O)cc3)c3ccccc3-c3ccccc32)cc1]

Example 7

Synthesis of Polyester Using 3CBOC and BPA as Monomers

The same operation as in Example 1 was performed except that 3CBOC was used instead of 4CBOC, thus obtaining 1.12 g of the objective aromatic polyester (pale brown) (yield 75%).

Reference Example 1

Synthesis of Polyester Using Terephthalic Acid and BPA as Monomers

Into 10 mL of NMP, 1.02 g (5.00 mmol) of terephthalic acid dichloride was dissolved and 0.808 mL (10.0 mmol) of pyridine was added. Thereafter, 1.14 g (5.00 mmol) of BPA dissolved in 5 mL of NMP was added therein and the resultant was stirred at room temperature for 1 hour. The reaction mixture was put into a ten-fold volume of methanol and filtered to yield a white solid. This solid was washed using 100 mL of methanol and filtered to yield a white solid. This solid was dried overnight at 50° C. under a reduced pressure, thus obtaining 1.75 g of a polyester compound (white) (yield 98%).

TABLE 3

|  |  | Dicarboxylic acid monomer | Diol monomer | $T_{ig}$ (° C.) | $T_{mg}$ (° C.) | $T_m$ (° C.) | $T_d$ (° C.) |
|---|---|---|---|---|---|---|---|
| Examples | 1 | 4CBOC | BPA | 164 | 171 | 396 | 453 |
|  | 2 | 4CBOC | BPAF | 163 | 179 | 321 | 434 |
|  | 3 | 4CBOC | Hydro-quinone | 204 | 225 | 324 | 378 |
|  | 4 | 4CBOC | Biphenol | N.D. | N.D. | 325 | 413 |
|  | 5 | 4CBOC | Catechol | 167 | 174 | 322 | 392 |
|  | 6 | 4CBOC | Bisphenol-fluorene | N.D. | N.D. | 319 | 416 |
|  | 7 | 3CBOC | BPA | 144 | 151 | 330 | 374 |
| Reference Example | 1 | Terephthalic acid | BPA | 195 | 201 | 353 | 442 |

As indicated in Table 3, when the compound represented by formula (1) was used as a dicarboxylic acid monomer in place of conventional terephthalic acid, $T_m$ and $T_d$ of the resultant polyester compound were increased to a large extent (with the comparison between Example 1 and Reference Example 1). By using the compound represented by formula (1) as a dicarboxylic acid monomer, polyester compounds with high thermal resistance were obtained even when using a variety of diol monomers as well as BPA (Examples 2 to 7).

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A polyester compound, which is produced by reacting:
(1) a compound represented by formula (1):

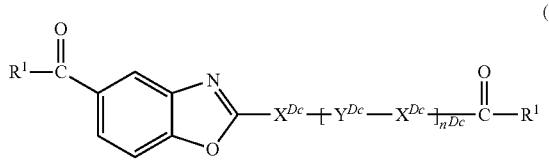

wherein
$R^1$ is a hydroxy group, a halogen atom, an alkoxy group, a cycloalkyloxy group, an aryloxy group, a —OM, or a group —O—Si$(R^2)_3$, where M is a metal atom and $R^2$ is an alkyl group;
$X^{Dc}$ is a phenylene group optionally having a substituent, a naphthylene group optionally having a substituent, an anthracenylene group optionally having a substituent, a furandiyl group optionally having a substituent, a pyridinediyl group optionally having a substituent, a thiophenediyl group optionally having a substituent, or a quinolinediyl group optionally having a substituent;
$Y^{Dc}$ is —O—, —N=N—, a carbonyl group, an ethenylene group optionally having a substituent, or a single bond;
$n^{Dc}$ is an integer of 0 to 2;
the two $R^1$ may be the same as or different from each other;
when there are a plurality of $X^{Dc}$, they may be the same as or different from each other; and
when there are a plurality of $Y^{Dc}$, they may be the same as or different from each other,
with
(2) a compound represented by formula (2):

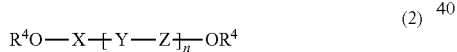

wherein
$R^4$ is a hydrogen atom, an acyl group, or a group —Si$(R^5)_3$, where $R^5$ is an alkyl group;
X is a phenylene group optionally having a substituent selected from the group consisting of a halogen atom and an alkyl group, or a naphthylene group optionally having a substituent selected from the group consisting of a halogen atom and an alkyl group;
Y is a methylene group optionally having a substituent, a group —S(=O)$_2$—, or a single bond;
Z is a divalent aromatic group optionally having a substituent;
n is 0 or 1; and
the two $R^4$ may be the same as or different from each other.

2. A polyester compound according to claim 1, wherein X is a phenylene group optionally having a substituent selected from the group consisting of a halogen atom and an alkyl group.

3. A polyester compound according to claim 1, wherein Z is a phenylene group optionally having a substituent.

4. A polyester compound according to claim 1, wherein said compound represented by formula (2) is one or more compounds selected from the group consisting of a bisphenol optionally having a substituent, dihydroxybenzene optionally having a substituent, dihydroxynaphthalene optionally having a substituent, and biphenol optionally having a substituent.

5. A polyester compound according to claim 1, wherein $n^{Dc}$ is 0, and $X^{Dc}$ is a phenylene group optionally having a substituent.

6. A polyester compound according to claim 1, wherein:
i) n is 0, and X is a phenylene group optionally having a substituent selected from the group consisting of a halogen atom and an alkyl group, or
ii) n is 1, X is a phenylene group optionally having a substituent selected from the group consisting of a halogen atom and an alkyl group, Y is a methylene group optionally having a substituent or a single bond, and Z is a phenylene group optionally having a substituent.

7. A polyester compound according to claim 1, wherein said substituent is selected from the group consisting of a halogen atom, an alkyl group, an aryl group, a hydroxy group, and an amino group.

8. A polyester compound according to claim 1, wherein said compound represented by formula (2) is one or more compounds elected from the group consisting of a compound of formula (2-1) to formula (2-3) and formula (2-5) to formula (2-13):

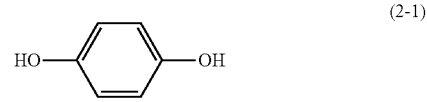

-continued

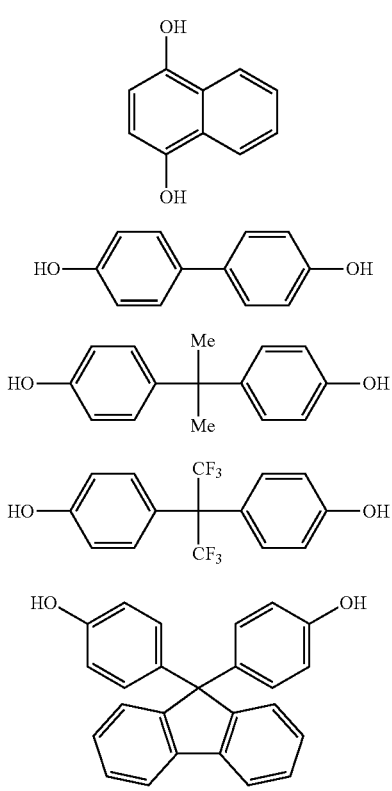

(2-8)

(2-9)

(2-10)

(2-11)

(2-12)

-continued

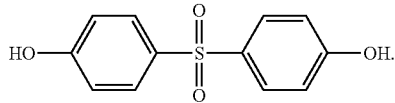

(2-13)

9. A polyester compound according to claim 8, wherein said compound represented by formula (2) is a compound represented by formula (2-1), formula (2-2), formula (2-9), formula (2-10), formula (2-11), or formula (2-12).

10. A polyester compound according to claim 1, wherein the polyester compound is produced by reaction of said compound represented by formula (1), said compound represented by formula (2), and one or more compounds selected from the group consisting of an aromatic dicarboxylic acid, a salt thereof, an ester thereof, and a halide thereof.

11. A polyester compound according to claim 1, wherein said polyester compound is produced by reacting said compound represented by formula (1) and said compound represented by formula (2) in a molar ratio, (compound represented by Formula (1))/(compound represented by Formula (2)), of 10/1 to 1/10.

12. A polyester compound according to claim 1, wherein said polyester compound is produced by reacting said compound represented by formula (1) and said compound represented by formula (2) at a reaction temperature of −10 to 200° C.

13. A polyester compound, which contains one or more structural units of formulae (i) to (iv):

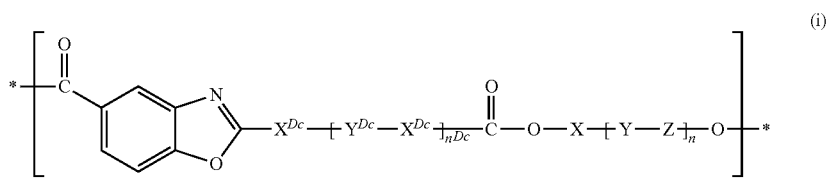

(i)

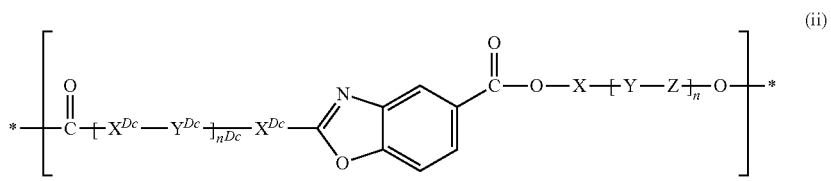

(ii)

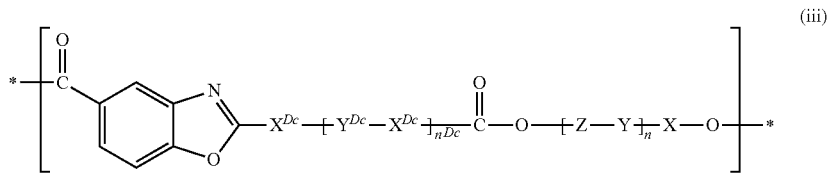

(iii)

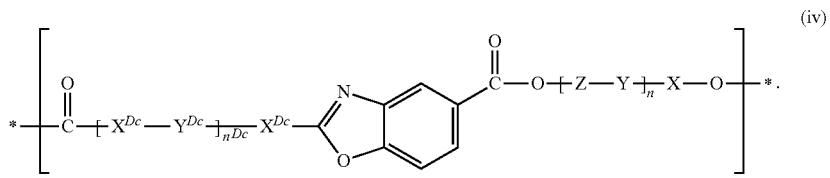

(iv)

wherein

X$^{Dc}$ phenylene group optionally having a substituent, a naphthylene group optionally having a substituent, an anthracenylene group optionally having a substituent, a furandiyl group optionally having a substituent, a pyridinediyl group optionally having a substituent, a thiophenediyl group optionally having a substituent, or a quinolinediyl group optionally having a substituent;

Y$^{Dc}$ is —O—, —N=N—, a carbonyl group, an ethenylene group optionally having a substituent, or a single bond;

n$^{Dc}$ is an integer of 0 to 2;

X is a phenylene group optionally having a substituent selected from the group consisting of a halogen atom and an alkyl group, or a naphthylene group optionally having a substituent selected from the group consisting of a halogen atom and an alkyl group;

Y is a methylene group optionally having a substituent, a group —S(=O)$_2$—, or a single bond;

Z is a divalent aromatic group optionally having a substituent;

n is 0 or 1;

* is a bond;

when there are a plurality of X$^{Cc}$, they may be the same as or different from each other; and when there are a plurality of Y$^{Dc}$, they may be the same as or different from each other.

14. A polyester compound according to claim 13, which has an intermediate glass transition point (T$_{mg}$) of 150° C. or higher and 300° C. or lower.

15. A polyester compound according to claim 13, which has a melting point (T$_m$) of 300° C. or higher and 500° C. or lower.

16. A polyester compound according to claim 13, which has a 5% mass reduction temperature (T$_d$) of 370° C. or higher and 500° C. or lower.

17. A method of producing a polyester compound, comprising reacting:

(1) a compound represented by formula (1):

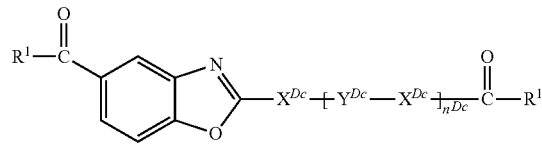

(1)

wherein

R$^1$ is a hydroxy group, a halogen atom, an alkoxy group, a cycloalkyloxy group, an aryloxy group, a group —OM, or a group —O—Si(R$^2$)$_3$, where M is a metal atom and R$^2$ is an alkyl group;

X$^{Dc}$ is a phenylene group optionally having a substituent, a naphthylene group optionally having a substituent, an anthracenylene group optionally having a substituent, a furandiyl group optionally having a substituent, a pyridinediyl group optionally having a substituent, a thiophenediyl group optionally having a substituent, or a quinolinediyl group optionally having a substituent;

Y$^{Dc}$ is —O—, —N=N—, a carbonyl group, an ethenylene group optionally having a substituent, or a single bond;

n$^{Dc}$ is an integer of 0 to 2;

the two R$^1$ may be the same as or different from each other;

when there are a plurality of X$^{Dc}$, they may be the same as or different from each other; and when there are a plurality of Y$^{Dc}$, they may be the same as or different from each other, with (2) a compound represented by formula (2):

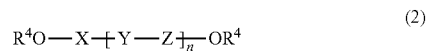

(2)

wherein

R$^4$ is a hydrogen atom, an acyl group, or a group —Si(R$^5$)$_3$, where R$^5$ is an alkyl group;

X is a phenylene group optionally having a substituent selected from the group consisting of a halogen atom and an alkyl group, or a naphthylene group optionally having a substituent selected from the group consisting of a halogen atom and an alkyl group;

Y is a methylene group optionally having a substituent, a group —S(=O)$_2$—, or a single bond;

Z is a divalent aromatic group optionally having a substituent;

n is 0 or 1; and the two R$^4$ may be the same as or different from each other, at a molar ratio, (compound represented by formula (1)/(compound represented by formula (2)), of 10/1 to 1/10.

* * * * *